Oct. 23, 1962 L. S. McMILLIAN, JR 3,060,328

COMMUTATOR UTILIZING ONLY FLIP-FLOPS AND COINCIDENCE CIRCUITS

Filed July 6, 1959

INVENTOR
LONNIE S. McMILLIAN, JR.

BY Hurvitz & Rose

ATTORNEYS

United States Patent Office 3,060,328

Patented Oct. 23, 1962

3,060,328
COMMUTATOR UTILIZING ONLY FLIP-FLOPS AND COINCIDENCE CIRCUITS

Lonnie S. McMillian, Jr., Melbourne, Fla., assignor to Radiation, Inc., Melbourne, Fla., a corporation of Florida Filed July 6, 1959, Ser. No. 825,236
6 Claims. (Cl. 307—88.5)

Figures 1, 2:
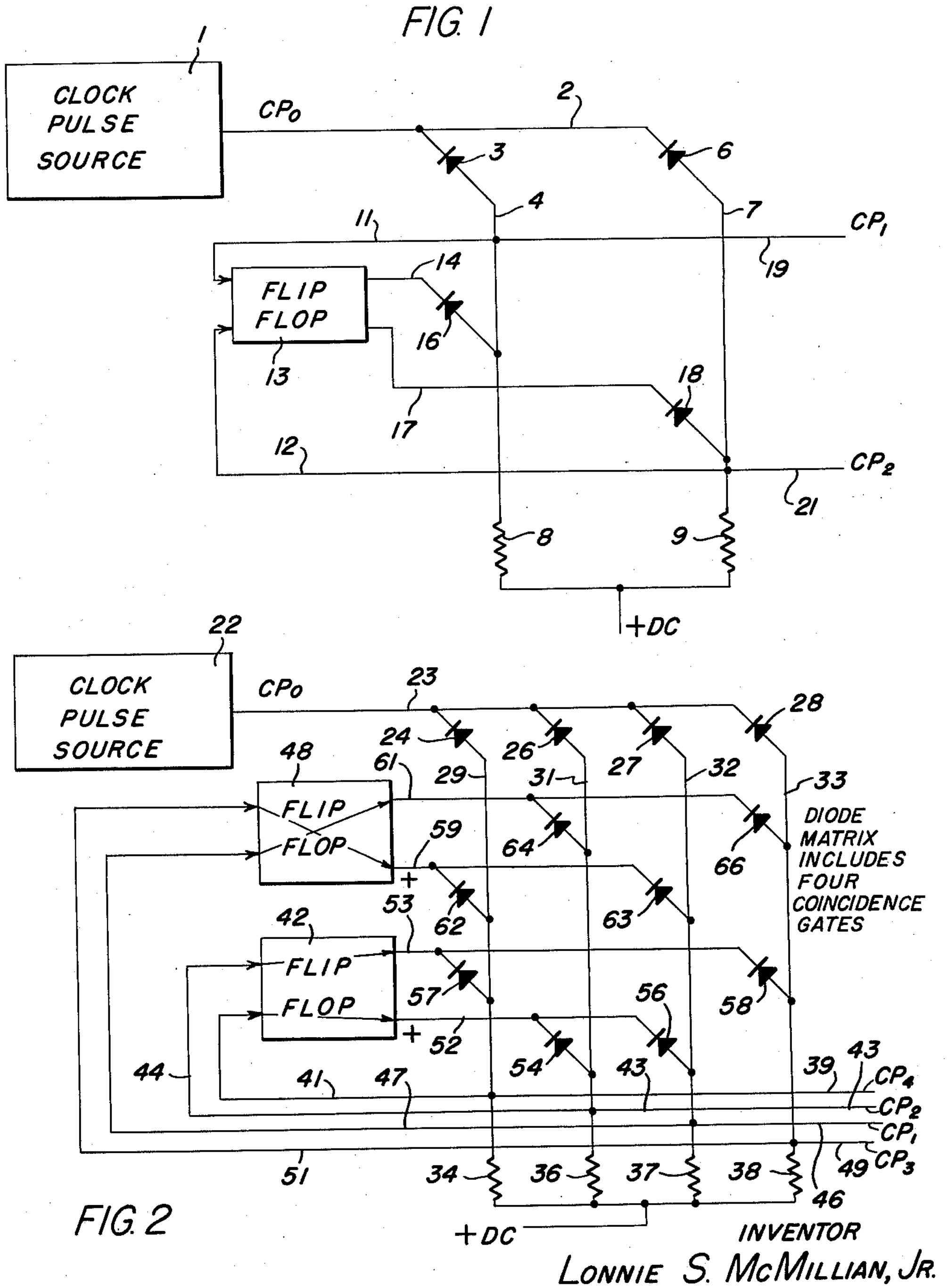

The present invention relates to commutators and more particularly to an electronic commutating circuit for digital pulse handling and processing equipment. Still more particularly, the apparatus of the present invention relates in one embodiment thereof to a clock pulse generator in which clock pulses from a master clock pulse source are routed to various leads sequentially and successively to produce pulse trains on these leads at frequencies which are accurate submultiplies of the clock pulse frequency.

In circuits now employed for producing a plurality of clock pulse trains which are submultiples of a master clock pulse train, it is conventional to apply a pulse train from a master generator to flip-flop circuits which produce at their outputs pulse trains which divide the input repetition rate by two to a power equal to the number of cascaded flip-flop stages employed to produce a particular pulse train. A pulse train may be obtained from each flip-flop in the cascaded train and these pulse trains may be applied to gating circuits so that pulses of a same frequency but of different times of occurrence appear on a plurality of clock pulse output leads which leads are applied to various elements of digital control circuits to control the timing of various events.

The difficulty with circuits of this type is that the delays through the various flip-flops are not equal and further, the clock pulses applied to various leads proceed through different numbers of cascaded flip-flop stages so that the total delay in deriving one clock pulse may be greater or lesser than the delay in deriving another clock pulse which may have proceeded through a different number of flip-flop stages. In consequence, the timing of various pulse utilization circuits is not precise and, more particularly, the elapsed times between the occurrence of various events differ since the phases of the various clock pulses differ. Further, since the output signals are taken from the flip-flops, the utilization circuits load the flip-flops and adversely affect their rise times.

In accordance with the present invention, there is provided a pulse commutating circuit employing flip-flops for determining the routing of various pulses but which flip-flops are not disposed along the path of the pulses and therefore do not introduce time delays therein. Specifically, the circuit includes a plurality of coincidence gates having clock pulses from a main clock pulse generator applied to one input circuit of each of the gates. The other input circuits to the coincidence gates are connected to output circuits of various flip-flops, each having two output circuits. Only one output circuit of each flip-flop has a voltage developed thereon at any instant and this voltage primes the coincidence gates to which it is connected so that upon the application of a clock pulse to the gate, the clock pulse is passed therethrough. This pulse is applied over an output lead to a utilization circuit and is also applied back to one of the flip-flops to cause it to change state and therefore prime another gate. The interconnection between the flip-flops and the coincidence gates is such that pulses appear sequentially and successively on the output leads one at a time and at a frequency which is equal to the clock pulse frequency divided by the number of coincidence gates. The pulses proceed directly from the clock pulse source through the gates to the output lead and the flip-flops serve only to select the gate through which a pulse passes upon its next appearance and therefore are not disposed along the path of the pulse itself. Consequently, all clock pulses appear on the various output leads of the commutator of the present invention with substantially no delay whatever since coincidence gates, particularly of the diode crystal or semi-conductor diode types, have substantially no inherent delay therein. Thus, the pulses do not experience phase shifts with respect to one another and by employing a suitable number of gates and flip-flops the basic master clock pulse frequency can be divided to any desired submultiple of the basic frequency and may be applied to a number of outputs equal to this division factor. In a large size digital computer, a basic clock pulse wave train may constitute a series of 48 pulses and these pulses can be divided to a frequency of 1/48 the basic frequency and applied to 48 distinct commutator circuit output leads.

The circuit of the present invention finds further advantage in that it insures proper commutation of the flip-flops since pulses are routed to the flip-flops in accordance with the output signals from the flip-flops and therefore the chances of inaccurate operation or misdirection of pulses is eliminated. Further, since the output pulses are derived from the coincidence gates rather than the flip-flops, which are isolated from the lead circuits by the gates, the flip-flops are not loaded and their rise times are not affected by the pulse utilization circuits.

It is an object of the present invention to provide a pulse commutating circuit employing flip-flops for controlling routing of pulses, which flip-flops are not disposed in the pulse path and therefore do not delay pulses in passing through the commutating circuit.

It is another object of the present invention to provide a clock pulse commutating circuit for deriving a plurality of clock pulses on distinct output leads from a master clock pulse wave train appearing on a single lead which circuit employs flip-flop circuits for selecting the specific lead on which a particular clock pulse is to appear but which flip-flops do not appear in series with the pulse handling circuits and therefore do not introduce delay times into the circuits.

It is another object of the present invention to provide a pulse commutating circuit employing flip-flops for sequentially and successively routing the pulses of a pulse train to distinct output leads in a predetermined order, which flip-flops do not appear in the series with the pulse handling circuits and therefore do not delay pulses due to passage therethrough and further in which the flip-flop circuits are isolated from the pulse utilization circuits and therefore the rise time is not affected by loading from the utilization circuits.

It is yet another object of the present invention to provide a pulse commutating circuit employing interconnected flip-flops and coincidence gates which insure proper routing of pulses, and isolate the flip-flops from the pulse utilization circuits.

The above and still further objects, features and advantages of the present invention will become apparent upon consideration of the following detailed description of one specific embodiment thereof especially when taken in conjunction with the accompanying drawings, wherein:

FIGURE 1 is a schematic wiring diagram of the basic circuit of the present invention; and FIGURE 2 is a schematic wiring diagram of a clock pulse generator utilizing the basic circuit as illustrated in FIGURE 1.

Referring specifically to FIGURE 1 of the accompanying drawings, there is illustrated a basic commutating circuit in accordance with the present invention. The circuit includes a clock pulse generator 1 for applying clock pulses to a lead 2. The lead 2 is connected through a first diode 3 to a lead 4 and through a second diode 6 to a lead 7. The diodes 3 and 6 and other diodes employed throughout the circuits of the present invention may be crystal diodes, semi-conductor diodes or vacuum tube diodes, depending upon the conditions under which the circuit is to be utilized. The leads 4 and 7 are connected through resistors 8 and 9 respectively to a source of positive direct voltage and are also connected via leads 11 and 12 respectively to two distinct input circuits of a flip-flop 13. The flip-flop 13 is of the type that switches from one state of conduction to the other state of conduction in response to the sequential and successive application of pulses alternately to the leads 11 and 12. The flip-flop circuit 13 is provided with a first output lead 14 which is connected via a diode 16 to the lead 4 and is provided with a second output lead 17 which is connected via a diode 18 to the lead 7. The diodes 3 and 16 and the resistor 8 constitute a first coincidence gate which develops a positive voltage on the lead 4 in response to the application of positive voltage to the leads 2 and 14 simultaneously. Similarly, the diodes 6 and 18 and resistor 9 constitute a second coincidence gate which produces a positive voltage on the lead 7 in response to the application of positive voltages on the leads 2 and 17. A first output lead 19 is connected to the lead 4 and a second output lead 21 is connected to the lead 7.

In operation, and it is assumed that initially a positive voltage is developed on the output lead 14 of the flip-flop circuit 13 and that no voltage, a negative voltage or a very low positive voltage is developed on the output lead 17 of the flip-flop circuit 13. Upon the application of a positive clock pulse to the lead 2, the coincidence gate comprising the diodes 3 and 16 and resistor 8 have positive voltages applied to both of its diodes and a positive voltage is developed on the lead 4. This voltage appears on the lead 4 substantially instantaneously with the application of the voltage pulse to the lead 2 and constitutes a first output clock pulse which appears on the output lead 19. The voltage pulse on the lead 4 is also applied via the lead 11 to one input circuit of the flip-flop 13 and the circuit is flipped to its other state of conduction so that a positive voltage now appears on the lead 17 and positive voltage is removed from the lead 14. In consequence, upon the occurrence of the next clock pulse on the lead 2 positive voltages are applied to the diodes 6 and 18 and a positive voltage is developed on the lead 7. The positive voltage on the lead 7 is applied to the lead 21 substantially instantaneously with the application of a second clock pulse to the lead 2 and is also applied via the lead 12 to the other input circuit to the flip-flop 13. The flip-flop 13 now switches to its other state of conduction so that a positive voltage appears on the lead 14 and positive voltage is removed from the lead 17. Thus, a complete cycle of operation has been completed, and in response to successive clock pulses appearing on the lead 2 positive pulses appear sequentially and in alternation on the output leads 19 and 21 without being delayed by having to proceed first through the flip-flop 13. It is seen from the description that there is substantially no delay of the output pulses relative to the pulses on lead 2 since the pulses appearing on the output leads 19 and 21 proceed through the coincidence gate only and do not have to proceed through the flip-flop. Voltage outputs from the circuit are fed back to the flip-flop and constitute commutating voltages therefor but the switching pulses applied to the flip-flop 13 occurs simultaneously with the output pulses and the flip-flop may thereafter assume a second state of conduction without interfering with the time of occurrence of the output pulses.

Referring now specifically to FIGURE 2 of the accompanying drawings there is illustrated a clock pulse generating apparatus which employs the basic circuit of FIGURE 1 but extends the concept of the invention to utilization with a decoding coincidence gate matrix which permits the employment of any desired plurality of flip-flop circuits so that the input clock pulses may be divided into any desired number of output clock pulses. A clock pulse source 22 applies a clock pulse train to a lead 23 which is connected through diodes 24, 26, 27 and 28 to leads 29, 31, 32 and 33 respectively and the leads 29, 31, 32 and 33 are connected through resistors 34, 36, 37 and 38 respectively to a source of positive direct voltage. The lead 29 is connected to a clock pulse output lead 39 and via a second lead 41 to one input circuit of a flip-flop 42. The lead 31 is connected to clock pulse output lead 43 and also to a lead 44 which is connected to a second input circuit of the flip-flop 42. The lead 32 is connected to a clock pulse output lead 46 and also to a lead 47 which is connected to one input circuit of a second flip-flop 48. The lead 33 is connected to a clock pulse output lead 49 and also via a lead 51 to a second input to the flip-flop 48. The flip-flop 42 has two output leads 52 and 53 with the lead 52 being connected via diodes 54 and 56 to the leads 31 and 32 respectively while the lead 53 is connected via diodes 57 and 58 to the leads 29 and 33 respectively. The flip-flop 48 is provided with two output leads 59 and 61 with the lead 59 connected via diodes 62 and 63 to the leads 29 and 32 respectively, while the lead 61 is connected via diodes 64 and 66 to the leads 31 and 33 respectively. The diodes 24, 57 and 62 and the resistor 34 constitute a first coincidence gate, the diodes 26, 54 and 64 and resistor 36 constiute a second coincidence gate, the diodes 27, 56 and 63 and resistor 37 constitute a third coincidence gate, while the diodes 28, 58 and 66 and resistor 38 constitute a fourth coincidence gate. If it is assumed initially that the leads 52 and 59 are positive, then upon the application of a positive clock pulse to the lead 23, positive voltages are applied to all three of the diodes 27, 56 and 63 and a positive voltage is developed on the lead 32. Concurrently, a voltage is developed on the lead 46 which constitutes the first clock pulse output lead and a voltage is applied via the lead 47 to the flip-flop 48 so that the lead 61 of the flip-flop 48 now obtains a positive voltage. Upon the application of the next clock pulse, positive voltages are applied to the diodes 26, 54 and 64 so that a positive pulse is applied to lead 31. The pulse on lead 31 appears on lead 43 as clock pulse CP–2 and is applied via lead 44 to the flip-flop 42. The lead 53 now has a positive voltage applied thereto and in response to the next clock pulse on lead 23, positive voltages are applied to the diodes 28, 58 and 66. A positive voltage is applied to the lead 33 and clock pulse CP–3 is developed on lead 49. The voltage on lead 33 is applied via lead 51 to the flip-flop 48 which switches its state of conduction. A positive voltage is now developed on lead 59 and upon the occurrence of the next clock pulse CP–0 positive voltages are applied to the diodes 24, 57 and 62 so that a positive voltage also appears on the lead 29. The voltage on the lead 29 is also applied to the clock pulse output lead 39 and on the lead 41. The voltage on the lead 41 is applied to the flip-flop 42 and the lead 52 again has a positive voltage applied thereto. The circuit is now back to its original condition and it is seen that a complete cycle of operation has been accomplished and each of the output leads 46, 43, 49 and 39 have had positive voltages applied thereto successively and in alternation. Again, there is substantially no time delay between the appearance of the clock pulse on the lead 23 and its appearance on one of the leads 39, 43, 46 or 49 and therefore, substantially no phase shift occurs between the various clock pulses appearing on the various output leads. As in the circuit of FIGURE 1, change of states of conduction of the flip-flops 42 and 48 occur during the interval the clock pulses appear on the output leads and extend past these intervals only for a brief period equal to the time delay through the flip-flops. Therefore, the duty cycle and/or repetition rate of the circuit are limited only by the delay through the flip-flops although this delay in no way effects the timing of the output pulses themselves.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An electronic commutator comprising a first lead adapted to receive a train of pulses, a plurality of coincidence gates each having input circuits and one output circuit, said first lead connected to one input circuit of each of said coincidence gates, a plurality of commutator output leads each connected to an output circuit of a different one of said coincidence gates, a plurality of flip-flops each having two input circuits and two output circuits, each of said flip-flops alternately energizing said output circuits in response to pulses applied alternately to said input circuits, one of said output circuits of each of said flip-flops being connected to different input circuits of all of said coincidence gates, each of said output circuits of said coincidence gates being connected to a different one of said input circuits of said flip-flops, said coincidence gates and said flip-flops being interconnected such that pulses appear cyclically and in a predetermined order on said commutator output leads in response to the application of a train of pulses to said input lead.

2. An electronic commutator comprising a first lead adapted to receive a train of pulses, a plurality of coincidence gates each having input circuits and one output circuit, said first lead connected to one input circuit of each of said coincidence gates, a plurality of commutator output leads each connected to an output circuit of a different one of said coincidence gates, a plurality of flip-flops each having two input circuits and two output circuits, each of said flip-flops alternately energizing said output circuits in response to pulses applied alternately to said input circuits, one of said output circuits of each of said flip-flops being connected to one input circuit of a plurality of all of said coincidence gates such that each output circuit shares a different coincidence gate with each possible permutation of output circuits of the other of said flip-flops, said output leads of said coincidence gates each being connected to a different one of said input circuits of said flip-flops in an arrangement with regard to the interconnection of said flip-flop output circuits and said coincidence gate input circuits such that said commutator output leads cyclically receive pulses in a predetermined sequence in response to the application of a pulse train to said input lead.

3. An electronic commutator comprising a first lead adapted to receive a train of pulses, a plurality of flip-flops each having two input circuits and two output circuits, each of said flip-flops alternately energizing said output circuits in response to pulses applied alternately to said input circuits, a plurality of coincidence gates equal to the total number of output circuits of said flip-flops, said coincidence circuits each having one output circuit and a number of input circuits equal to one greater than the number of flip-flops, each of said input circuits of said coincidence circuits including a diode as the active element thereof, a plurality of commutator output leads each connected to a different output circuit of said coincidence circuits, each of said output circuits of said flip-flops being connected to different input circuits of said coincidence gates, each of said output circuits of said coincidence gates being connected to a different one of said input circuits of said flip-flops, said coincidence gates and said flip-flops being interconnected such that pulses appear cyclically and in a predetermined order on said commutator output leads in response to the application of a train of pulses to said input lead.

4. An electronic switching circuit responsive to a control signal comprising N flip flops, where N is an integer greater than one, each of said flip flops having two input terminals and deriving a first binary output signal indicative of its binary state, and a further binary output signal indicative of the complement of its binary state, 2 N gates, each of said gates being responsive simultaneously to said control signal and to only one binary output signal of each of said N flip flops, each of said gates deriving an output signal only when said control signal attains a predetermined state and the binary signals to which it is responsive are of a like, predetermined state, and means for coupling the output signal of each gate to a different one of said input terminals to change the binary state of the respective flip flop.

5. The circuit of claim 4 wherein each of said coincidence circuits includes $(N+1)$ diodes, each of said diodes being responsive to a separate one of the signals applied to the coincidence circuit.

6. The circuit of claim 4 wherein each output signal of each flip flop is applied to the same number of gates.

References Cited in the file of this patent

UNITED STATES PATENTS

| | | |
|---|---|---|
| 2,644,887 | Wolfe | July 7, 1953 |
| 2,787,416 | Hansen | Apr. 2, 1957 |
| 2,787,712 | Priebe | Apr. 2, 1957 |
| 2,831,127 | Braicks | Apr. 15, 1958 |
| 2,885,574 | Roesch | May 5, 1959 |
| 2,947,865 | Estrens | Aug. 2, 1960 |
| 2,958,828 | Schreiber | Nov. 1, 1960 |
| 2,964,657 | Page | Dec. 13, 1960 |
| 2,971,157 | Harper | Feb. 7, 1961 |